US007694456B1

(12) United States Patent
Curtis

(10) Patent No.: US 7,694,456 B1
(45) Date of Patent: Apr. 13, 2010

(54) FLYING INSECT TRAP

(76) Inventor: William A. Curtis, P.O. Box 2951, Salisbury, MD (US) 21802

( * ) Notice: Subject to any disclaimer, the term of this patent is extended or adjusted under 35 U.S.C. 154(b) by 94 days.

(21) Appl. No.: 11/853,252

(22) Filed: Sep. 11, 2007

(51) Int. Cl.
A01M 1/10 (2006.01)
A01M 1/02 (2006.01)

(52) U.S. Cl. .......................................... 43/122; 43/107
(58) Field of Classification Search .................. 43/107, 43/122, 114
See application file for complete search history.

(56) References Cited

U.S. PATENT DOCUMENTS

| 38,277 | A | * | 4/1863 | Bassett | 43/122 |
|---|---|---|---|---|---|
| 420,490 | A | * | 2/1890 | Barnard | 43/122 |
| 1,091,550 | A | * | 3/1914 | Walters | 43/122 |
| 1,131,120 | A | * | 3/1915 | Crawford | 43/122 |
| 1,360,127 | A | * | 11/1920 | Mckay | 43/122 |
| 1,371,870 | A | * | 3/1921 | Michal | 43/122 |
| 2,182,863 | A | * | 12/1939 | Dodder | 43/113 |
| 4,161,079 | A | * | 7/1979 | Hill | 43/114 |
| 4,217,722 | A | * | 8/1980 | McMullen | 43/114 |
| 4,218,842 | A | * | 8/1980 | Anderson | 43/122 |
| 4,360,987 | A | * | 11/1982 | Lowder | 43/122 |
| 4,638,592 | A | * | 1/1987 | Schneidmiller | 43/122 |
| 4,709,504 | A | * | 12/1987 | Andric | 43/114 |
| 4,718,193 | A | * | 1/1988 | Rosselli | 43/122 |
| 4,794,724 | A | * | 1/1989 | Peters | 43/122 |
| 4,899,485 | A | * | 2/1990 | Schneidmiller | 43/122 |
| 5,172,513 | A | * | 12/1992 | Reibling | 43/107 |
| 5,253,450 | A | * | 10/1993 | Muramatsu | 43/122 |
| 5,311,697 | A | * | 5/1994 | Cavanaugh et al. | 43/107 |
| 5,392,558 | A | * | 2/1995 | Blomquist | 43/122 |
| 5,406,743 | A | * | 4/1995 | McSherry et al. | 43/122 |
| 5,454,186 | A | * | 10/1995 | Gang | 43/114 |
| 5,461,822 | A | * | 10/1995 | Green et al. | 43/122 |
| 5,497,576 | A | * | 3/1996 | Nowak | 43/114 |
| 5,522,171 | A | * | 6/1996 | Mandeville | 43/122 |
| 5,540,011 | A | * | 7/1996 | Groom et al. | 43/122 |
| 5,622,001 | A | * | 4/1997 | Kazmierzak | 43/122 |
| 5,682,706 | A | * | 11/1997 | Altenburg | 43/122 |
| 5,749,168 | A | * | 5/1998 | Chrysanthis | 43/122 |
| 6,209,256 | B1 | * | 4/2001 | Brittin et al. | 43/122 |
| 6,543,181 | B1 | * | 4/2003 | Baker et al. | 43/107 |
| 6,618,983 | B1 | * | 9/2003 | Spragins | 43/107 |
| 6,925,749 | B2 | * | 8/2005 | Wong | 43/122 |
| 7,093,389 | B1 | * | 8/2006 | Meier et al. | 43/122 |
| 7,222,453 | B2 | * | 5/2007 | Uhl | 43/122 |
| 7,458,183 | B2 | * | 12/2008 | Meier et al. | 43/122 |
| 2004/0237379 | A1 | * | 12/2004 | Long | 43/107 |
| 2006/0236592 | A1 | * | 10/2006 | Hall | 43/122 |
| 2008/0196296 | A1 | * | 8/2008 | Studer et al. | 43/122 |
| 2009/0126257 | A1 | * | 5/2009 | Banfield | 43/122 |

FOREIGN PATENT DOCUMENTS

| DE | 19947749 A1 | * | 4/2001 |
|---|---|---|---|
| JP | 08322448 A | * | 12/1996 |
| JP | 10146349 A | * | 6/1998 |
| JP | 2001148991 A | * | 6/2001 |
| JP | 2002153192 A | * | 5/2002 |
| JP | 2002272344 A | * | 9/2002 |
| JP | 2003061540 A | * | 3/2003 |
| JP | 2003079300 A | * | 3/2003 |
| JP | 2003144030 A | * | 5/2003 |
| WO | WO 9959403 A1 | * | 11/1999 |

* cited by examiner

Primary Examiner—Darren W Ark

(57) ABSTRACT

A flying insect trap which includes a container body, a lid for engaging the container body, a plurality of apertures in the lid, and an attractant containing at least apple cider, vinegar and liquid soap in the container body.

4 Claims, 4 Drawing Sheets

FLYING INSECT TRAP

FIELD OF THE INVENTION

The present invention generally relates to an insect avoidance device and more particularly, relates to a flying insect trap particularly suitable for trapping flying gnats.

BACKGROUND OF THE INVENTION

Flying insects present a very tedious problem in our daily lives. Flying insects are more prevalent in warm weather climates such as in the southern states of the United States. While some flying insects present a biting or stinging hazard to humans, other flying insects may present other problems when they gather around food items attracted by the smell of foods. For instance, fruit flies and gnats are the more frequently seen flying insects that are attracted by fragrance of fruit. It is therefore desirable to provide a flying insect trap that is particularly suitable for attracting and trapping flying insects such as gnats such that they are kept away from food items.

It is therefore an object of the present invention to provide flying insect trap that does not have the drawbacks or shortcomings of the conventional insect traps.

It is another object of the present invention to provide a flying insect trap that is particularly suitable for attracting flying gnats.

It is a further object of the present invention to provide a flying insect trap that is particularly suitable for attracting and trapping flying gnats.

SUMMARY OF THE INVENTION

In accordance with the present invention, a flying insect trap is that is particularly suitable for attracting and trapping gnats is provided.

In a preferred embodiment, the present invention flying insect trap is constructed of a container body that has a top opening and cavity therein; a lid for sealingly engaging the top opening of the container body; a plurality of apertures each having a minimum diameter of 2 mm in the lid; and an attractant containing at least apple cider, vinegar and liquid soap positioned in the cavity of the container body.

BRIEF DESCRIPTION OF THE DRAWINGS

The invention will now be described, by way of example, with reference to the accompanying drawings, in which.

DETAILED DESCRIPTION OF THE PREFERRED EMBODIMENT

The present invention discloses a flying insect trap that is particularly suitable for attracting and trapping flying gnats.

The present invention flying insect trap is a trap for flying gnats, or other types of fruit flies. It consists of a plastic dish that measures between 2 and 6 inches in diameter, and about 1 and 2 inches deep. Its lower underside includes a peel-off strip covered adhesive pad in order to permit it to be mounted on a table, counter top or related support. Its upper surface includes a series of small perforations, or apertures. It is filled with a solution that contains at least apple cider, vinegar and a liquid soap. The present invention flying insect trap can be produced in a refillable version that includes a detachable lid. In either case, it would come equipped with a peel-off cover prior to usage.

The present invention flying insect trap fulfills the need for an improved method of eradicating gnats. The appealing features of the present invention flying insect trap are its convenience and ease of use. The trap can be set up in a matter of seconds in a kitchen, patio area, etc. It attracts and traps and ultimately kills gnats.

Figure 1:
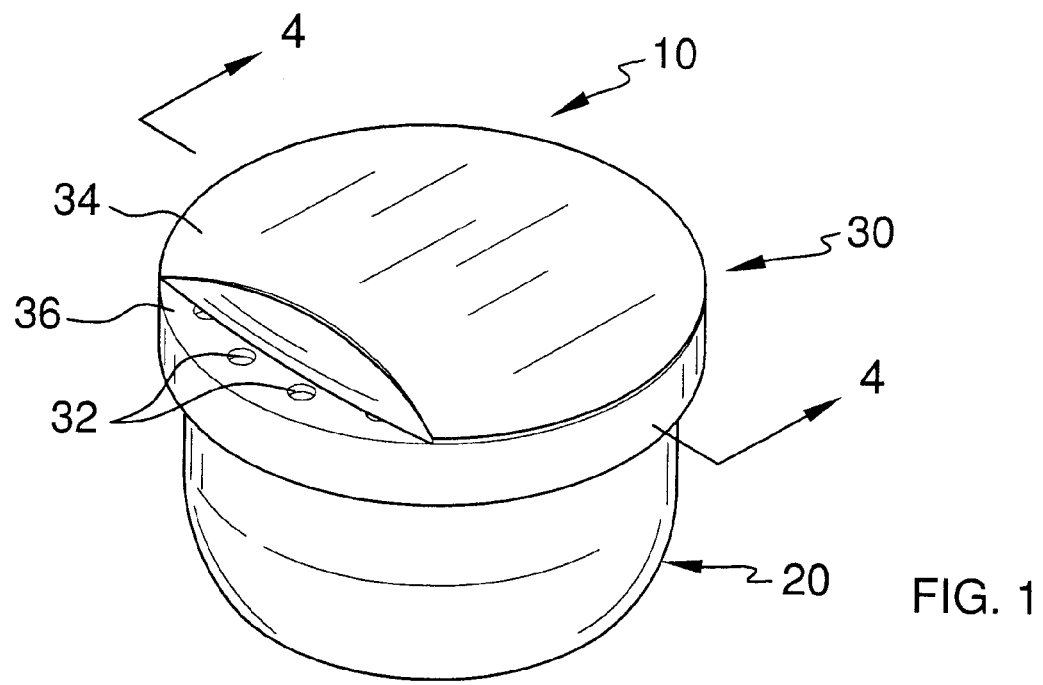
FIG. 1 is a perspective view of the present invention flying insect trap with a peel-off seal on top.

Referring initially to FIG. 1, wherein a present invention flying insect trap 10 is shown. The flying insect trap 10 is constructed of a container body 20 which has a top opening 22, shown in FIG. 3, and a cavity 24 therein, wherein the container body 20 has a sidewall 21 with an upper portion that defines the top opening 22 and a lower portion that converges to a flat bottom surface 16. A lid 30, shown in FIGS. 1, 2 and 3, sealingly engaging the top opening 22 of the container body 20.

A plurality of apertures 32 each having a minimum diameter of about 2 mm, and preferably of about 3 mm are provided through the lid 30. An attractant 26 that contains at least the components of apple cider, vinegar and a liquid soap is positioned in the bottom of the cavity 24 of the container body 20.

Figure 2:
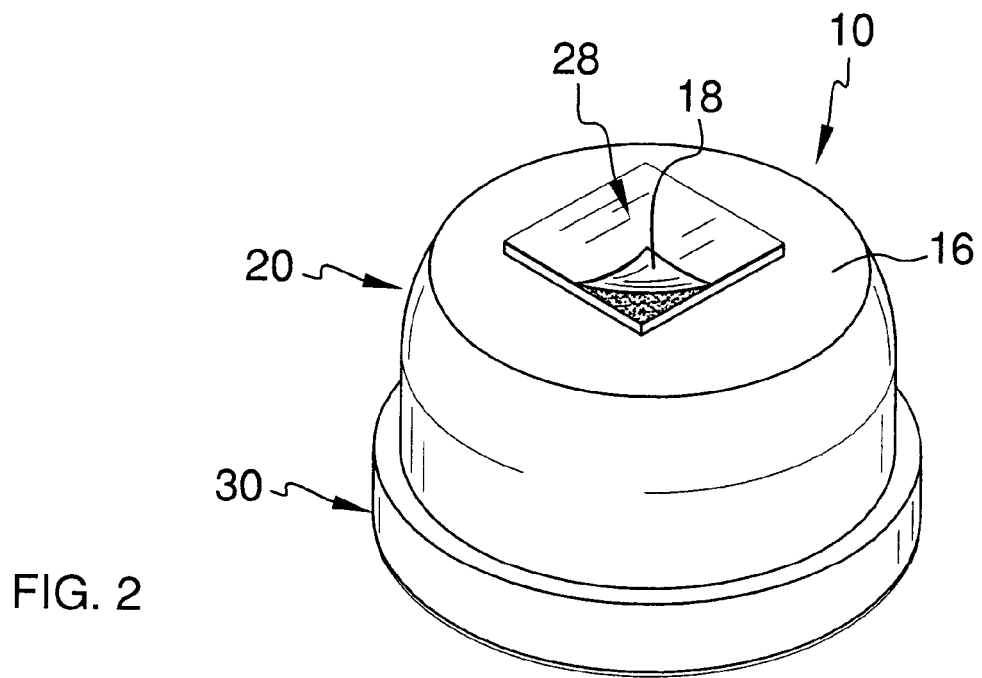
FIG. 2 is a perspective view of the present invention flying insect trap of FIG. 1 shown in an upside down position.
Figure 3:
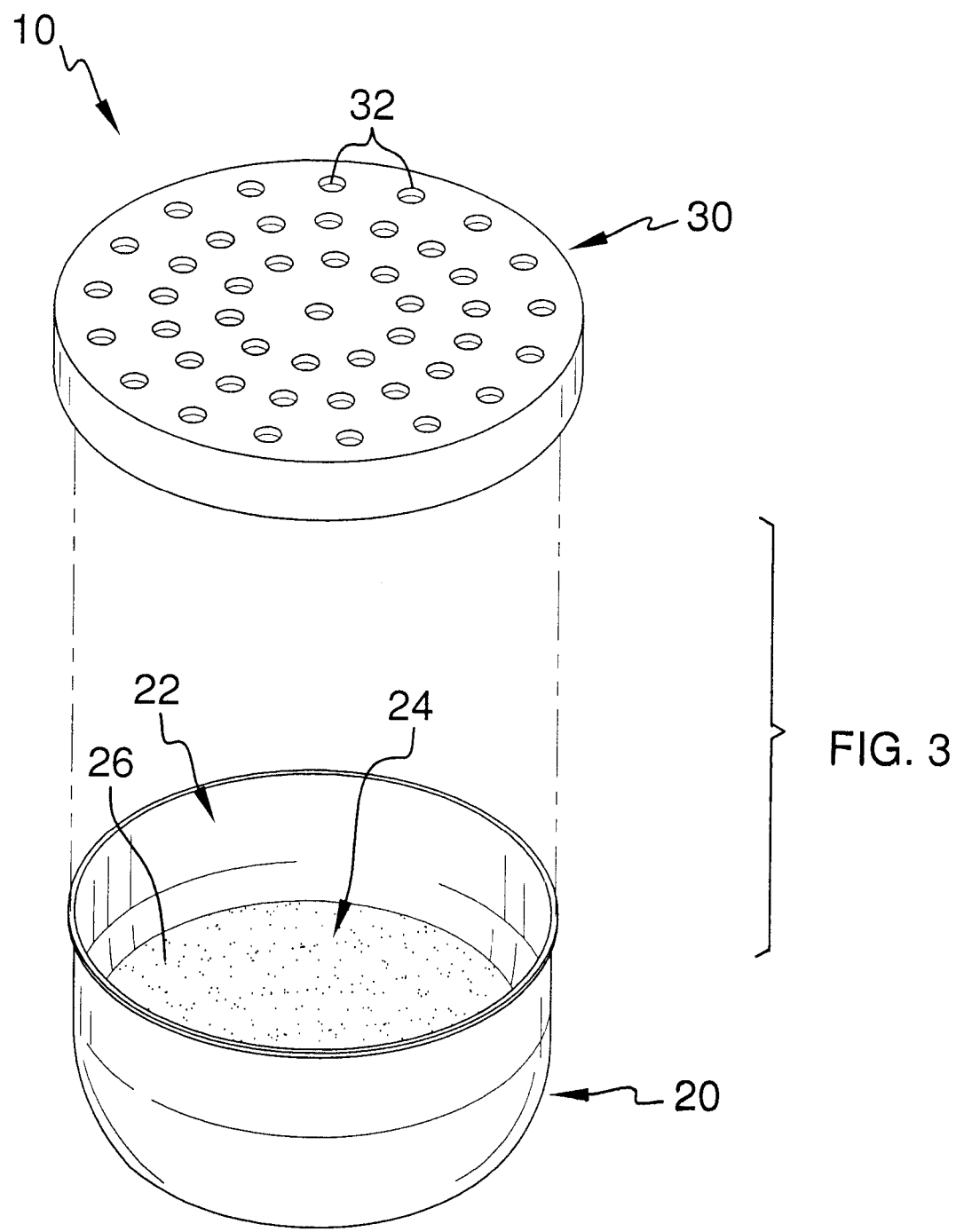
FIG. 3 is a perspective view of the present invention flying insect trap with the lid removed from the container body.
Figure 6:
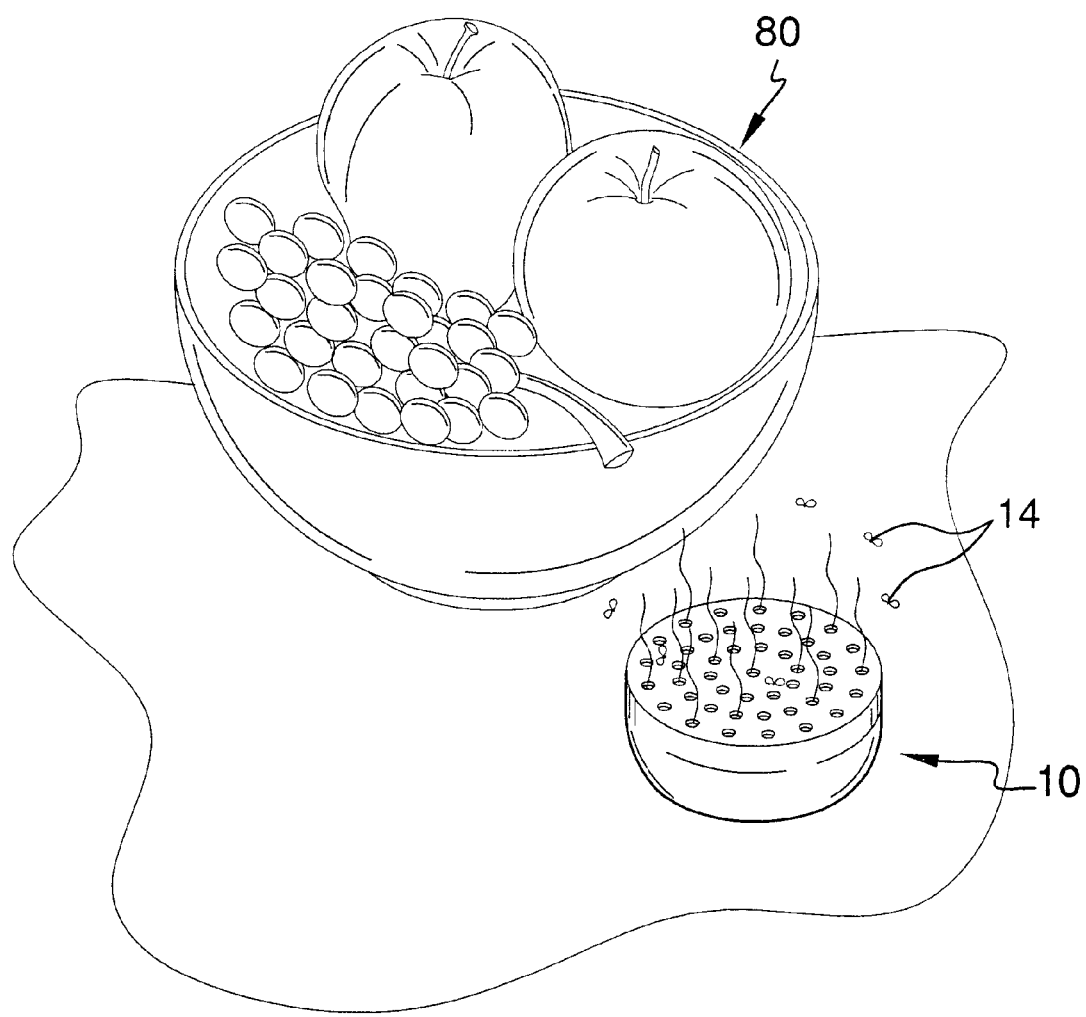
FIG. 6 is a perspective view illustrating how the present invention flying insect trap is utilized.

Also shown in FIGS. 1 and 2 are a peel-off seal 34 that covers a top surface 36 of the lid 30 and therefore seals the plurality of apertures 32 before usage, and a double-sided tape 28 which includes a peel-off backing film 18 is provided in a bottom surface 16 of the container body 20. The double-sided tape 28 allows the container body 20 to be mounted at any desirable locations without being blown over or knocked over accidentally. For instance, as shown in FIG. 6 where the present invention flying insect trap is mounted in the proximity of a fruit bowl 80 in order to attract flying insects such as gnats 14.

Figure 4:
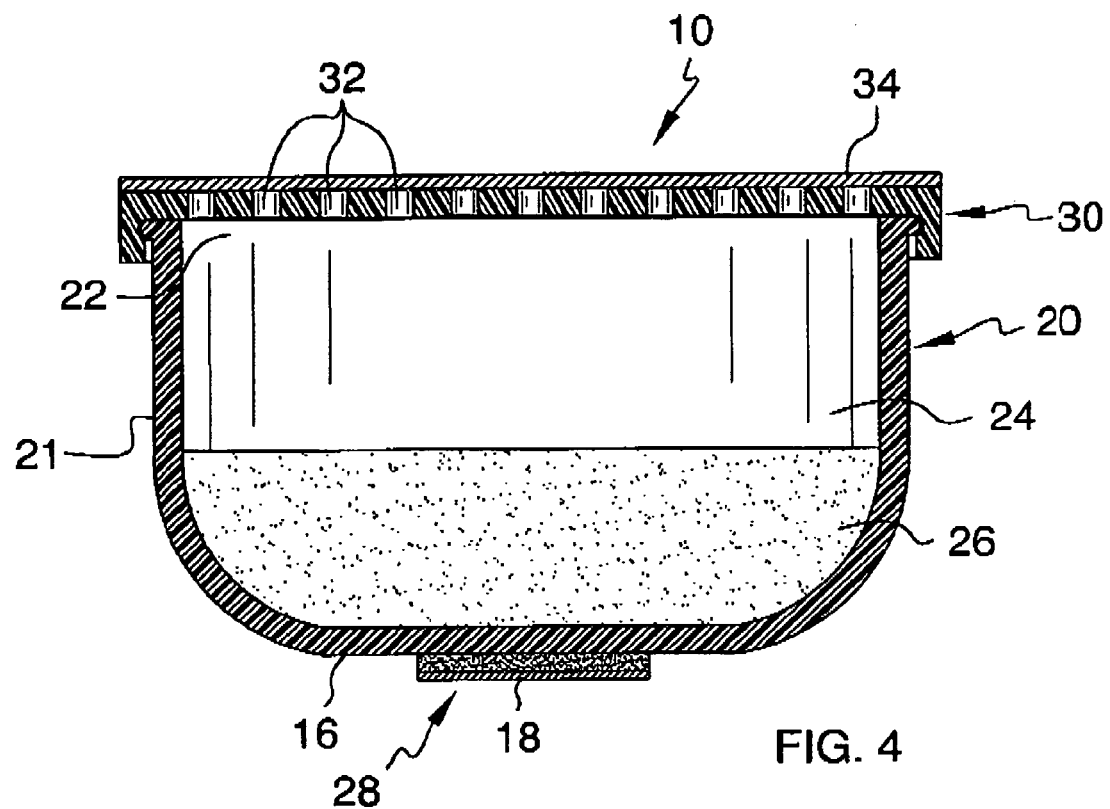
FIG. 4 is a cross-sectional view of the present invention flying insect trap.
Figure 5:
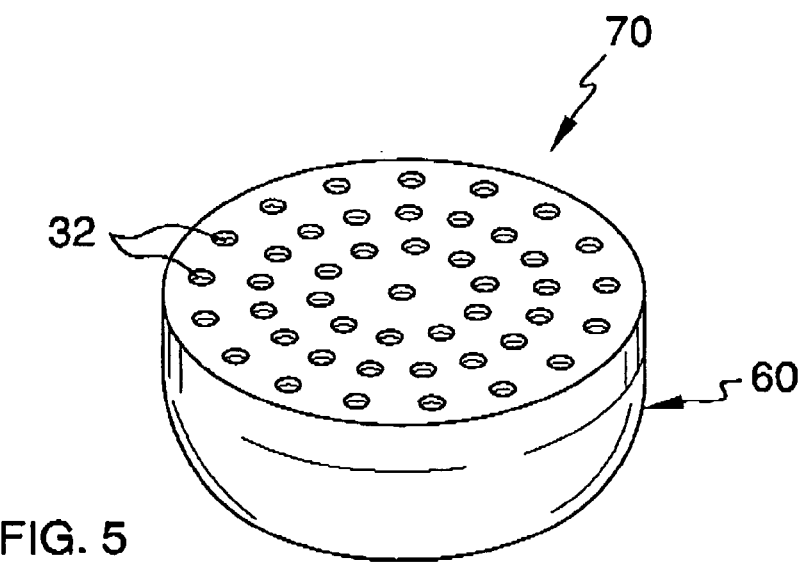
FIG. 5 is a perspective view of the another embodiment of the present invention flying insect trap wherein the lid and the container body are formed in one part.

A cross-sectional view of the present invention flying insect trap 10 is shown in FIG. 4 with the peel-off seal 34 on top of the lid 30. An alternate embodiment 70 of the present invention flying insect trap wherein the lid 30 and the container body 20 are formed in a single part 60 is shown. In this alternate embodiment, only a single use is permitted since it would be difficult to refill the attractant 26 in the cavity 24.

The present invention flying insect trap has therefore been amply described in the above descriptions and in the appended drawings of FIGS. 1-6.

While the preferred embodiments of the invention have been described above, it will be recognized and understood that various modifications can be made in the invention and the appended claims are intended to cover all such modifications which may fall within the spirit and scope of the invention.

What is claimed is:

1. A flying insect trap comprising:
   a container body having a sidewall, a top opening and a cavity therein, said container body sidewall having upper and lower portions, said upper portion of said sidewall both defining said top opening and extending parallel to a longitudinal axis of said container body, said lower portion of said sidewall curving toward said longitudinal axis of said container body and converging at a flat bottom surface of the container body opposing said top opening, said flat bottom surface extending in a plane which is perpendicular to said longitudinal axis of said container body and having a diameter which is smaller than a diameter of said top opening;

said container body further comprising a double sided adhesive tape mounted on said flat bottom surface of the container body;

a lid for sealingly engaging said top opening of the container body, said lid having a top surface and a bottom surface, said top and bottom surfaces of said lid extending in planes which are parallel to each other;

said lid further comprising a peel-off seal on said top surface thereof prior to usage;

a plurality of apertures each having a minimum diameter of 2 mm in said lid, said plurality of apertures extending through said lid and being perpendicular to said top and bottom surfaces of said lid; and an attractant solution containing at least apple cider, vinegar and liquid soap positioned in said cavity of the container body.

2. The flying insect trap according to claim 1, wherein said container body and said lid are formed of a plastic material.

3. The flying insect trap according to claim 1, wherein said attractant solution is in a viscous liquid form.

4. The flying insect trap according to claim 1, wherein said plurality of apertures each having said minimum diameter of 3 mm.

* * * * *